United States Patent [19]

Ebihara et al.

[11] Patent Number: 5,247,410
[45] Date of Patent: Sep. 21, 1993

[54] MAGNETIC DISK APPARATUS USING A ROTARY ACTUATOR FOR MAGNETIC HEAD POSITIONING WITH REDUCED VIBRATION

[75] Inventors: Susumu Ebihara, Chigasaki; Masaaki Matsumoto, Higashiyamato; Kenji Mori, Tsuchiura; Jun Naruse; Tsuyoshi Takahashi, both of Odawara; Yoshiyuki Hirano, Yono, all of Japan

[73] Assignee: Hitachi, Ltd., Tokyo, Japan

[21] Appl. No.: 712,540

[22] Filed: Jun. 10, 1991

[30] Foreign Application Priority Data

Jun. 19, 1990 [JP] Japan .................. 2-160724

[51] Int. Cl.⁵ .............................................. G11B 5/55
[52] U.S. Cl. ................................. 360/106; 360/97.01
[58] Field of Search ........... 360/106, 107, 109, 99.04, 360/99.08, 99.03, 97.01

[56] References Cited

U.S. PATENT DOCUMENTS

| | | | |
|---|---|---|---|
| 4,352,133 | 9/1982 | Hager | 360/106 |
| 4,398,167 | 8/1983 | Dickie et al. | 335/272 |
| 4,916,342 | 4/1990 | Hirano et al. | 360/106 X |
| 5,016,131 | 5/1991 | Riggle et al. | 360/106 |
| 5,027,242 | 6/1991 | Nishida et al. | 360/97.01 X |

FOREIGN PATENT DOCUMENTS

| | | |
|---|---|---|
| 0355692 | 8/1989 | European Pat. Off. |
| 57-191880 | 11/1982 | Japan |
| 59-072973 | 4/1984 | Japan |
| 59-210573 | 11/1984 | Japan |
| 63-152065 | 6/1988 | Japan |

*Primary Examiner*—John H. Wolff
*Attorney, Agent, or Firm*—Antonelli, Terry, Stout & Kraus

[57] ABSTRACT

A magnetic disk apparatus includes a magnetic disk, a magnetic head which performs information recording and reproducing for the magnetic disk, a load spring for supporting the magnetic head, a head arm for fixing the load spring, a housing for housing these components, a shaft which fixes the head arm, bearings for supporting the shaft rotatably on the housing, and a motor which is coupled to the shaft. The motor comprises a motor cover, a permanent magnet which is divided into a plurality of segments and fixed on the shaft, and a coil which is fixed on the interior surface of the motor cover by being spaced with a certain gap from the permanent magnet. The shaft is included with a counter weight so as to complement the weight of the head arm, load spring and magnetic head. The coil has linear conductor sections parallel to the shaft, with the total number of linear sections being set equal to the total number of segments of permanent magnet.

14 Claims, 8 Drawing Sheets

F I G. 1
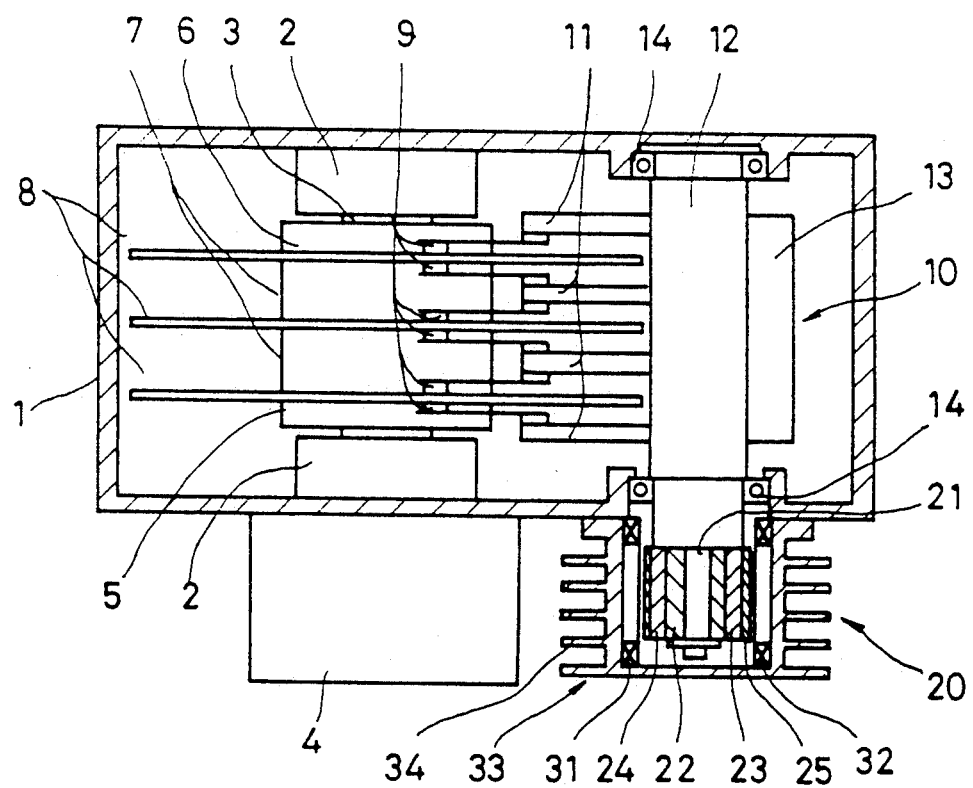

MAGNETIC DISK APPARATUS USING A ROTARY ACTUATOR FOR MAGNETIC HEAD POSITIONING WITH REDUCED VIBRATION

BACKGROUND OF THE INVENTION

This invention relates to a recording head positioning device for moving a recording head rotationally to a predetermined position over a recording medium.

Magnetic disk apparatus employ head positioning devices based on linear-drive voice coil motors (abbreviated by "VCMs") with the intention of fast and accurate head movement and positioning. The VCM comprises a coil disposed in a magnetic field which is produced in a space between fixed magnetic poles, and operates by being supplied with a current to the coil. In recent years, magnetic disk apparatus have been required to be compact in size and fast in access operation, and therefore compactness and large output are crucial for the VCM. In order to meet the demand, various improvements have been made on the VCM, which includes the use of high-performance magnets for reducing the size of the magnetic circuit, the use of a rectangular or flat wire for the coil conductor, the elimination of the bobbin for increasing the effective length of winding, and the use of a light-weight material and structure for the head and the carriage which supports the head for the movement. However, in the linear-motion actuator, the mass of its linear movement portion such as the carriage forms a direct load of motion, and therefore the accomplishment of a compact actuator is difficult. On this account, magnetic disk apparatus smaller than eight inches (about 20 cm) in disk diameter mostly employ rotary actuators.

A rotary actuator, as shown in FIG. 14, comprises a carriage 70 supported rotatably on a shaft 76 of a carriage support member 75, with a magnetic head 71 being mounted on one end and a coil 72 being wound on another end of the carriage 70. The distance of the coil 72 from the shaft 76, i.e., radial distance rc, is virtually equal to the distance rh of the magnetic head 71 from the shaft 76. A magnet 77 is fixed on the support member 75. The rotary actuator turns the carriage 70 to move the magnetic head 71 by producing a torque T which is expressed as a product of the electromagnetic force Fc created by the current flowing in the coil 72 and the radial distance rc of the coil. When the moment of inertia on the shaft 76 is assessed in terms of the equivalent mass at the head position, the carriage 70 which turns around the shaft 76 can have a smaller mass as compared with a linear actuator of the same size. Accordingly, the output required of the VCM decreases in proportion to the mass, and the reduction of size is possible.

Japanese Patent Unexamined Publication No. JP-A-57-191880 describes a head actuator intended for the above defect. This publication discloses the structure for fitting a motor at the end of the shaft of the carriage, but it describes nothing about the specific structure of the motor.

U.S. Pat. No. 4,398,167 discloses a specific structure of a motor which is fitted at the end of the shaft of the carriage. The motor is a moving-coil motor, in which a coil is fixed on the motor shaft and the coil section is adapted to turn.

SUMMARY OF THE INVENTION

The inventors of the present invention have found that the conventional technique of fitting a motor at the shaft end is not sufficiently effective against the vibration of the shaft and bearing section, although it is useful for the suppression of vibration of the carriage support member caused by the reaction Fm of the electromagnetic force Fc.

The inventors have also found a problem that the moving coil is low in rigidity due to its structure of laminated windings of a thin conductor wire molded with adhesive and it is apt to resonate at a frequency harmful for the control and the floating operation of the head when the coil moves during the head positioning. The inventors have further found a problem that the coil needs to have a large surface area for the cooling effect of the coil which heats up due to the conduction of the drive current and therefore the reduction of size is difficult.

This invention is intended to deal with the foregoing prior art deficiencies and its prime object is to provide a rotary actuator for head positioning capable of suppressing a harmful vibration.

Another object of this invention is to provide a rotary actuator for head positioning capable of preventing the resonation at a harmful frequency which emerges during the head drive.

Still another object of this invention is to provide a rotary actuator for head positioning which enables the reduction in size of the coil.

In order to achieve the above objectives, the rotary actuator for head positioning comprises a carriage which supports a head and rotates around a shaft, magnets which are fixed on the shaft, and non-rotatable coils which are fitted on the stationary member. The carriage is mounted in one section of the shaft, which has another section provided with a balancer which balances the shaft. A conductor, which induces a secondary current in response to the magnetic field produced by the coils, is provided preferably about the magnets. A cover which forms a yoke is provided about the stator coils, and a heat dissipation means which conducts or radiates the heat produced by the coils to the outside is provided in the periphery of the cover. The heat dissipation means may be provided directly on the coils. The yoke is formed of a high-permeability, non-electrically-conductive material, for example. The magnets have an even number of poles, with adjacent poles having opposite polarities, and they are fitted integrally on the shaft thereby to constitute an inner-rotor motor.

Next, the operation of the inventive rotary actuator will be explained.

With a current supplied to the stator coils, forces act on the magnets on the rotor. Each force is in the direction at a certain angle with the radial direction of the rotor. Since the magnets on the rotor are disposed symmetrically with respect to the shaft, the forces of symmetrical magnets have their radial components cancelled out with each other, leaving only circumferential components which act on the rotor centered by the shaft. Since the rotor is balanced on the shaft, only the momental forces act on the rotor, and no parallel forces exist. With only the momental forces acting on the rotor, it rotates without the emergence of vibration attributable to parallel forces, and it can drive the head stably.

Although the device shown in FIG. 14 has coils provided in virtually the same distance as the radial distance of the head, the magnets and coils are disposed in symmetrical positions around the shaft, and consequently the radial distance can be made smaller and the device can be made compact according to this invention.

It is a general convention to design the device to have as small moment of inertia of the rotor as possible so that it requires less energy to achieve the intended performance. In turning an object, the distance between the turn center and the force acting position can be made smaller by applying a momental force to the object, instead of applying a force to one end of the object with a point of the object being fixed. The conventional device needs to generate a drive force at the position with virtually the same distance as the head radial distance, and therefore a heavy magnet is placed on the stator in consideration of the moment of inertia, whereas according to this invention, momental forces arising around the shaft act on the rotor, whereby heavy magnets can be placed on the rotor.

The disposition of the magnets on the rotor results naturally in the disposition of the coils on the stator. Owing to the stator coils, conductors for connecting the drive current source to the coils are free from a deformation stress caused by the movement of coils, and the breakage due to fatigue or the like is prevented and the reliability is enhanced. Because of the low-rigid coils, which are formed of an elongated conductor, placed on the stator and the high-rigid magnets placed on the rotor, the rotor has an enhanced rigidity, preventing the resonation at a frequency which affects the control and the head floating operation. Moreover, the heat generated on the stator coils can readily by conducted to the structural member having a high thermal conductivity, which facilitates the provision of a heat dissipation means. This eliminates the need of a large surface area of the coils for the heat radiation to the air, and it contributes to the compactness of the coils.

As adjacent magnets being polarized oppositely, the magnetic flux can have a closed circuit which passes through adjacent opposite magnetic poles. Consequently, the leakage flux is reduced and this is advantageous for the compactness. In connecting the magnets magnetically with the magnetic yoke, the magnetic flux does not concentrate to some portions and the magnetic circuit can be closed with a minimal volume of yoke, and it can be made compact and the leakage magnetic flux can be reduced.

BRIEF DESCRIPTION OF THE DRAWINGS

FIG. 1 is a cross-sectional diagram showing the overall structure of the magnetic disk apparatus based on the first embodiment of this invention;

DESCRIPTION OF THE PREFERRED EMBODIMENT

Figure 2:
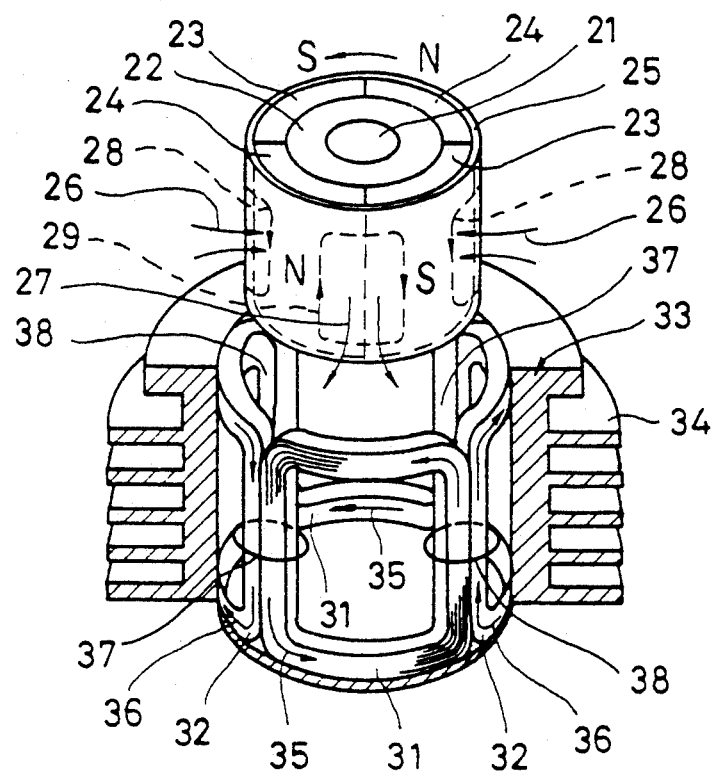
FIG. 2 is a partially developed perspective diagram of the motor shown in FIG. 1.

Embodiments of this invention will be described with reference to the drawings. Throughout the figures of embodiments, like portions are referred to by the common symbols.

The first embodiment of this invention will be described with reference to FIGS. 1 to 3.

The magnetic disk apparatus has a plurality of magnetic disks 8, which are fitted on a hub 5 that is secured on a spindle 3. The disks 8 are spaced out with spacers 7 and are fixed on the hub 5 with a clamp 6. The spindle 3 is supported rotatably by bearing 2, and it is coupled on its one end with a disk drive motor 4.

Magnetic heads 9 which record and reproduce information on the magnetic disks 8 are mounted on the head positioning actuator. The actuator comprises a carriage 10 on which the magnetic heads 9 are mounted, a motor 20 which turns the carriage, and a control circuit which is not shown in the figure. The motor 10 comprises head support members 11 having load springs and head arms for supporting the magnetic heads, a shaft 12, a counter weight 13, and a bearing 14. The magnetic heads 9 are supported by the head support members 11 so as to confront the recording surfaces of the magnetic disks 8. The head support members 11 are secured on the shaft 12, which is supported rotatably by the bearing 14 provided in a housing 1. The shaft 12 is provided with the counter weight 13 on the side opposite to the magnetic heads 9 and head support members 11. The shaft 12 is coupled at its one end with the actuator motor 20.

Figure 3:
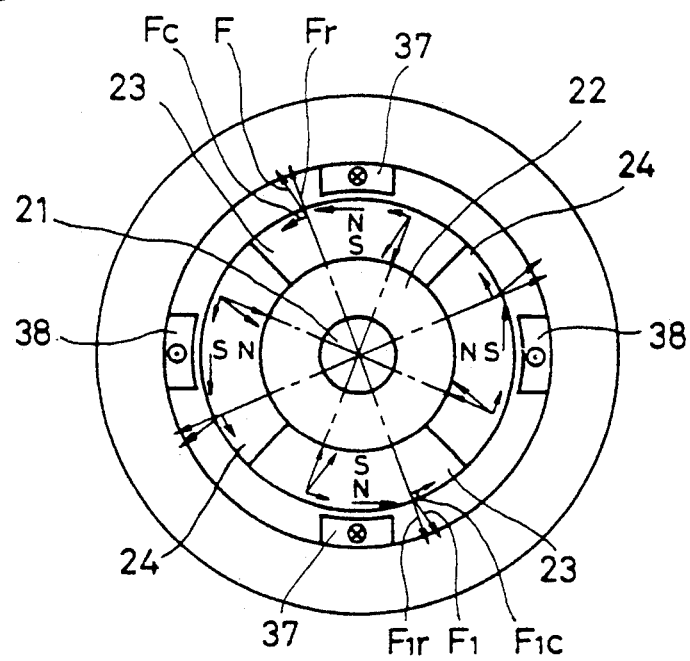
FIG. 3 is a diagram used to explain the operation of the motor shown in FIG. 2.

The motor 20 consists of a rotor and a stator as shown in FIG. 2. The rotor comprises a shaft 21 which is generally the same member as the shaft 12 of the carriage 10, an inner yoke 22 made of ferromagnetic material secured on the shaft 21, magnet segments 23 and 24 made of neodymium-based rare earth secured on the exterior surface of the yoke 22, and a cylindrical short ring 25 which covers the exterior surface of the magnets. The magnets 23 and 24 are magnetized in the radial direction so that exterior magnetic poles have opposite polarities alternately. These even number of magnets may alternatively be formed as a unitary magnet having an even number of sets of magnetic pole pairs fitted on the rotor. The magnets preferably have virtually linear demagnetizing characteristics and a recoil relative permeability virtually equal to one, and are formed of a material with a high energy product. Specifically, the material has a recoil relative permeability within 1.1 and a maximum energy product $(BH)_{max}$ of 80 kJ/m or more.

The short ring 25 is made of copper for example. The stator comprises rectangle-wound coils 31 and 32 formed in a shape of a curving surface as shown in the figure, and an outer yoke 33 made of NiZn-based ferrite material provided on the exterior periphery of the coils. The coils 31 and 32 are designed to have a total number of adjoining linear conductors 37 and 38 equal to the total number of magnet segments 23 and 24. The reason for this arrangement is that it is sufficient for the motor 20 to turn 90° at most, e.g., 20°, to move the magnetic heads 9. Accordingly, the coils are disposed so that the linear conductor sections 37 and 38 confront the same magnet segments 23 and 24 even if the motor 20 turns in its full range of turn. Although in this embodiment the total number of magnet segments and the total number of linear conductor sections parallel to the shaft 21 are each four, the number can be set arbitrarily, e.g., six, eight and so on, depending on the range of turn required. Cooling fins 34 are formed on the exterior surface of the outer yoke 33. The coils 31 and 32 are supplied with a drive current so that it flows in opposite directions in the adjacent coil sections as shown in FIG. 2.

Next, the performance of the first embodiment will be explained. When the disk drive motor 4 is activated and the disk speed reaches the prescribed speed for recording or playback, the control circuit (not shown) receives a command for moving the magnetic head 9 to a target track and supplies a prescribed drive current to the motor 20. With the drive currents 35 and 36 being supplied to the coils 31 and 32, the carriage 10 turns to move the magnetic head 9 to the target track.

Next, the operation of the motor 20 will be explained in detail with reference to FIG. 3. With the drive currents 35 and 36 being supplied to the coils 31 and 32, these currents flow in the same direction in the adjacent linear conductor sections 37 and 38 of the coils, producing a magnetic field. Since the outer yoke 33 made of NiZn-based ferrite has a high permeability of $4\pi \times (1/10^5)$H/m, it is magnetized by the magnetic field produced by the coils 31 and 32, and it reinforces the magnetic field which acts on the magnet segments 23 and 24.

The magnet segments 23 and 24 of the rotor interact with the magnetic field produced on the coil section, and they are subjected to a constant force F in the direction at a certain angle $\theta$ with respect to the radial direction. The magnet segments 23 and 24, each magnetized in the radial direction to have a pair of magnetic poles on the inner and outer extremes, are fitted on the ferromagnetic inner yoke 22. The inner magnetic pole is cancelled by the opposite magnetic pole induced on the inner yoke 22, and only the outer magnetic pole is subjected to the force of the magnetic field produced by the coils 31 and 32. The force F acting on each outer magnetic pole is coincident with the direction of magnetic field.

With attention being paid to the magnet segments which are disposed symmetrically with respect to the shaft 21, the force F has radial components Flr which are opposite in direction and equal in magnitude and therefore cancel each other. The force F has circumferential components Flc which are equal in magnitude, opposite in direction, and parallel to each other, producing momental forces which act through the center of the shaft 21. Consequently, only the momental forces are used as a drive force. The carriage 10 is provided with a counter weight 13 so that no inertial force due to the unbalanced carriage is created during the movement. Accordingly, no parallel force acts on the shaft 12 of the carriage and the shaft 21 of the motor, and no vibration caused by a parallel force is created.

When the drive currents 35 and 36 flow in the coils 31 and 32, magnetic fluxes 26 and 27 produced by the coils 31 and 32 pass through the short ring 25 on the rotor in its thickness direction as shown in FIG. 2. When the drive currents 35 and 36 flowing in the coils 31 and 32 vary during the starting phase or the like, the magnetic fluxes 26 and 27 passing through the short ring 25 also vary accordingly. Secondary currents 28 and 29 which enclose the magnetic fluxes 26 and 27 flow in the short ring 25 so as to retard the variation of magnetic flux. The secondary currents 28 and 29 flowing in the short ring 25 lower the rate of change of the magnetic fluxes 26 and 27, causing the drive currents 35 and 36 to rise more quickly.

The magnetic field produced in the space between the magnet segments 23 and 24 and the outer yoke 33 acts on the secondary currents 28 and 29, reinforcing the electromagnetic force, and the torque used to turn the carriage 10 increases.

It should be noted that the secondary currents 28 and 29 shown in FIG. 2 are in the state when the drive currents 35 and 36 are increasing, and the secondary currents flow in the opposite direction when the drive currents are decreasing.

A general problem which is often encountered in manufacturing a magnetic disk apparatus is the resonation at a frequency (1-4 kHz) harmful for the control and the floating operation of the head. In this embodiment, the less rigid coils 31 and 32 formed of windings of a thin conductor are placed on the stator and the rigid magnets 23 and 24 are placed on the moving part so that the carriage 10 has a high natural frequency, whereby the resonation at a frequency which is influential on the floating operation of the magnetic head 9 can be prevented.

If the coils 31 and 32 are placed on the moving part, conductors which connect the coils 31 and 32 to the drive current supply circuit are subjected to a stress due to the deformation of the coils 31 and 32 caused by their movement, and the fatigue of the conductor must be considered. According to this embodiment, the coils 31 and 32 are placed on the stationary part, and the conductors do not fatigue and the reliability of the conductors is retained.

The coils 31 and 32 heat up due to the conduction of the drive currents 35 and 36, and the heat is dissipated to the outside of the magnetic disk apparatus through the cooling fins 34 of the outer yoke 33 which is fitted to the exterior periphery of the coils 31 and 32. The coils 31 and 32 are cooled in this manner, and accordingly they do not need a large surface area for dissipating the heat to the air against the temperature rise, whereby the coils 31 and 32 can be made compact.

The magnet segments 23 and 24 are magnetized in the radial direction so that outer magnetic poles have opposite polarities alternately, and the magnetic flux from the magnet segment 23 can close through the adjoining magnet segments 24. Consequently, little magnetic flux leaks to the space, and the influence of the leakage flux on the magnetic disks 8 is not significant. In this embodiment, the magnet segments 23 and 24 for producing the magnetic flux and the coils 31 and 32 are covered by the yokes 22 and 33, which serve as a magnetic shield against their influence on the magnetic disks 8.

The magnet segments 23 and 24 are made of neodymium-based rare earth, and they have a maximum energy product $(BH)_{max}$ as large as 280 kJ/m, a linear demagnetizing characteristics, and a recoil relative permeability of 1.05 which is closed to one. Accordingly, the magnets attain a high-level magnetization and retain it against the demagnetizing field. Therefore, compact and high performance magnets can be obtained.

The outer yoke 33 of the stator is made of NiZn-based ferrite having a resistivity of $10^5$ Ωm, and owing to this non-conductive property, no eddy current flows in the yoke when the magnetic field varies through the movement of the magnets 23 and 24. Consequently, creation of a braking torque by the eddy current or heat generation by the energy loss do not occur.

Although in this embodiment the magnet segments 23 and 24 are made of neodymium-based rare earth, they may be formed of samarium-based rare earth or cerium-based rare earth, for example.

Figure 4:
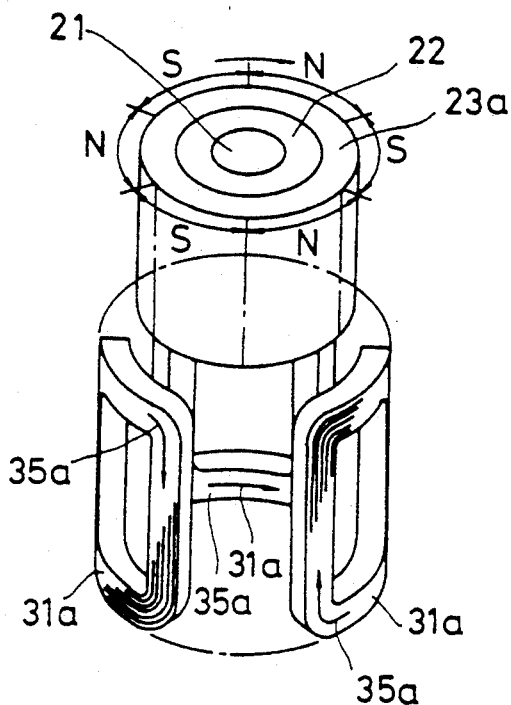
FIG. 4 is a partially developed perspective diagram of the motor which is a first variant of the embodiment.

Next, a first variant of the first embodiment will be explained with reference to FIG. 4. This variant is the modification of the interior of the motor 10 in the first embodiment. The rotor is provided with an integrated cylindrical magnet 23a magnetized to have six pairs of magnetic poles, and the stator is provided with three rectangle-wound coils 31a having six linear conductor sections parallel to the shaft 21. The remaining structure is identical to the first embodiment. The three coils 31a are arranged to conduct the drive currents 35a in the same direction. This variant accomplishes the same effectiveness as the first embodiment, and in addition it offers an increased output torque and reduced assembling work through the reduction of the total number of turns of coils, while increasing the number of poles.

Figure 5:
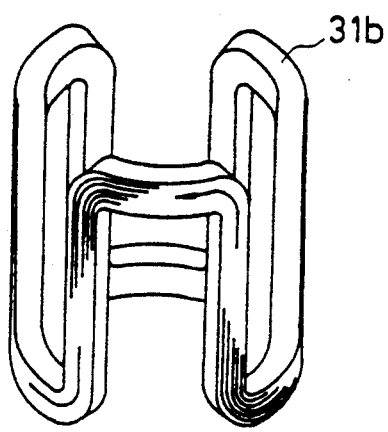
FIG. 5 is a perspective diagram showing the overall structure of the coil which is a second variant of the embodiment.

Next, a second variant of the first embodiment will be explained with reference to FIG. 5. This variant is the use of a coil 31b of conductor, which is formed to have a shape of three rectangular wave peaks, in correspondence to a 6-pole magnet as in the first variant. Although this variant involves a complex coil forming process, the assembling work can be reduced owing to the single coil 31b. The coil has six linear conductor sections parallel to the shaft 21.

Figure 6:
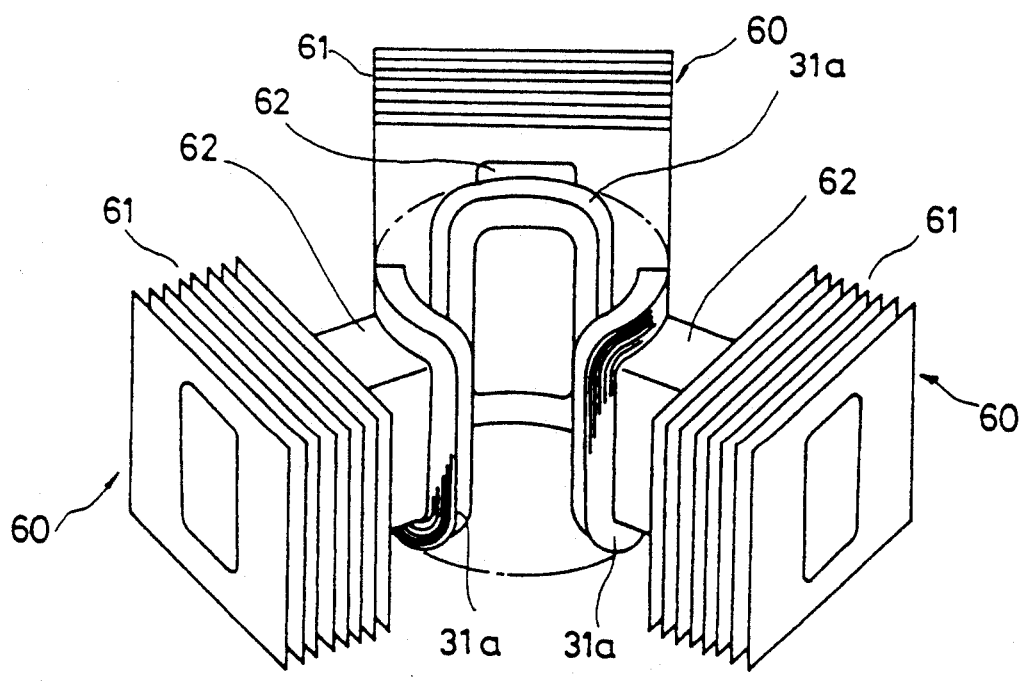
FIG. 6 is a perspective diagram of the coils and associated heat sink, showing a third variant of the embodiment.

Next, a third variant of the first embodiment will be explained with reference to FIG. 6. This variant is also applied to the arrangement of a magnet having six pole pairs and the stator provided with three rectangle-wound coils 31a, as in the first variant. The coils 31a are provided integrally with heat sinks 60. Each heat sink 60 is made up of cooling fins 61 which radiate the heat generated by the coil 31a and a thermal conductor 62 which propagates the heat from the coil 31a to the cooling fins 61. The heat sinks are filled with coolant when necessary. The thermal conductor 62 is placed in contact with the inner side of the coil 31a. The coolant in the thermal conductor 62 is vaporized by the heat generated by the coil 31a, and it is condensed following the thermal exchange with the outside by the cooling fins 61. In consequence, the heat generated by the coil 31a is dissipated from the cooling fins 60 to the outside through the coolant, and the temperature of the coil 31a is maintained within a certain range.

Figure 7:
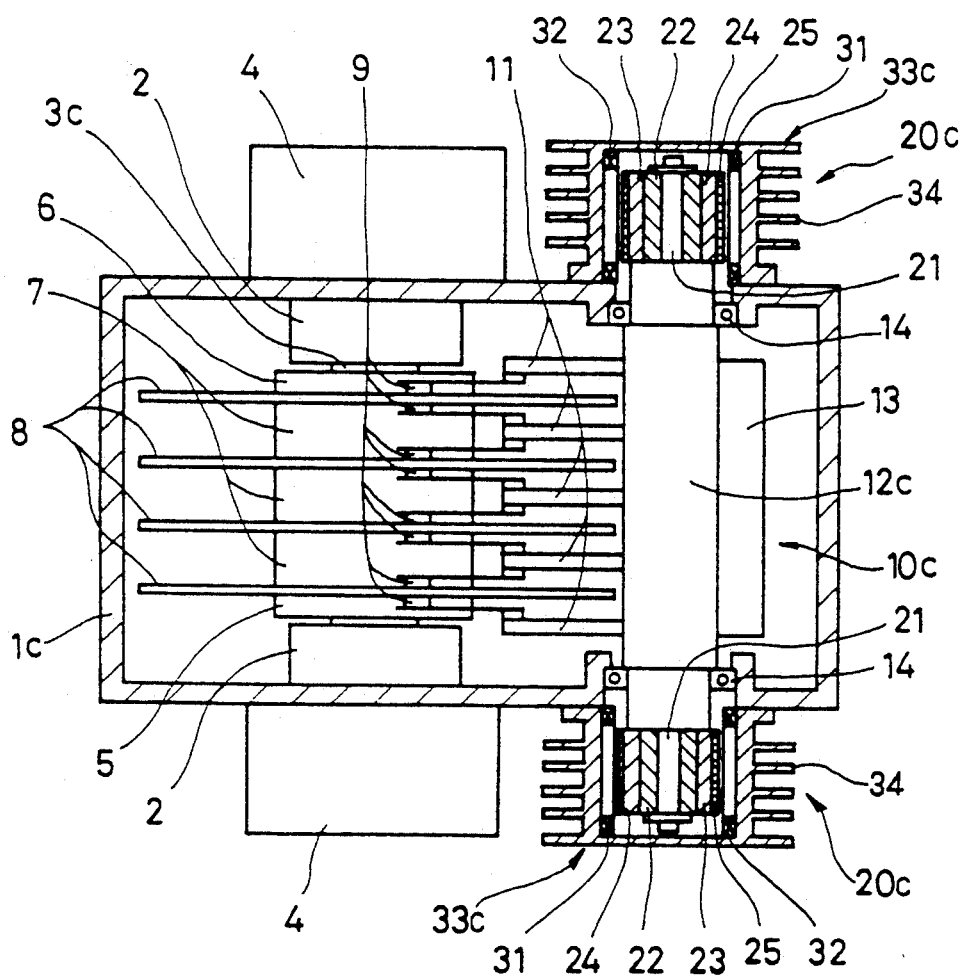
FIG. 7 is a cross-sectional diagram showing the overall structure of the magnetic disk apparatus based on the second embodiment of this invention.

Next, the second embodiment of this invention will be described with reference to FIG. 7.

This embodiment includes disk drive motors 4 provided on both ends of a spindle 3c and motors 20c provided on both ends of a shaft 12c of a carriage 10c. The motors 20c have outer yokes 33c formed of silicon steel plates with a 0.3 mm thickness laminated while being insulated along the axial direction. The remaining structure is identical to the first embodiment. By the provision of the motors on both ends of the shafts 3c and 12c, it is possible to increase the torque to rotate the spindle and the torque to move the heads. Owing to the improved symmetry of the structure, the displacement of the magnetic heads caused by an uneven distribution of temperature can be alleviated and the natural frequency of the carriage can be raised. The outer yoke 33c formed of a lamination of insulated silicon steel plates has a high permeability and retards the eddy current caused by the movement of the magnet(s) of the rotor, offering the same effectiveness as the first embodiment and facilitating the fabrication of sturdy cooling fins.

Figure 8:
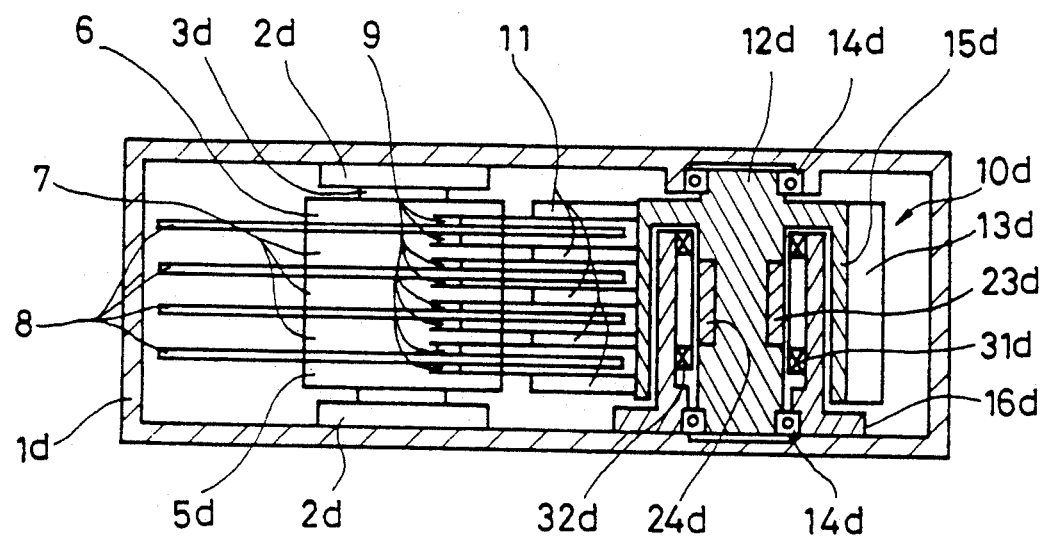
FIG. 8 is a cross-sectional diagram showing the overall structure of the magnetic disk apparatus based on the third embodiment of this invention.

Next, the third embodiment of this invention will be described with reference to FIG. 8.

This embodiment is a structure in which a disk drive motor (not shown) is built inside a hub 5d and a carriage turning motor is built inside a carriage 10d. The carriage 10d comprises rotary shaft 12d, an outer cylinder 15d which covers the shaft 12d, a head support member 11 provided on the outer cylinder 15d, and a counter weight 13d which complements the head support member 11. The shaft 12d is made of ferromagnetic material, and it is supported rotatably on its both ends by bearings 14d. Secured on the virtually central section of the shaft 12d are an even number of magnet segments 23d and 24d. The outer cylinder 15d is fixed on the shaft 12d so that it turns with the shaft 12d. Disposed in the space between the outer cylinder 15d and shaft 12d is an inner cylinder 16d, which has one end secured on a housing 1d. The coils 31d and 32d are placed on the inner wall of the inner cylinder 16d so as to confront the magnet segments 23d and 24d fitted on the shaft 12d.

The arrangement of the magnet segments 23d and 24d and the coils 31d and 32d of the motor 10d and its fundamental operation are identical to the first embodiment. In this embodiment, the shaft 12d serves as the inner yoke and the inner cylinder 16d serves as the outer yoke. This embodiment, in which the disk drive motor is built inside the hub 5d and the carriage turning motor is built inside the carriage 10d, enables the reduction of height of the magnetic disk apparatus.

Figure 9:
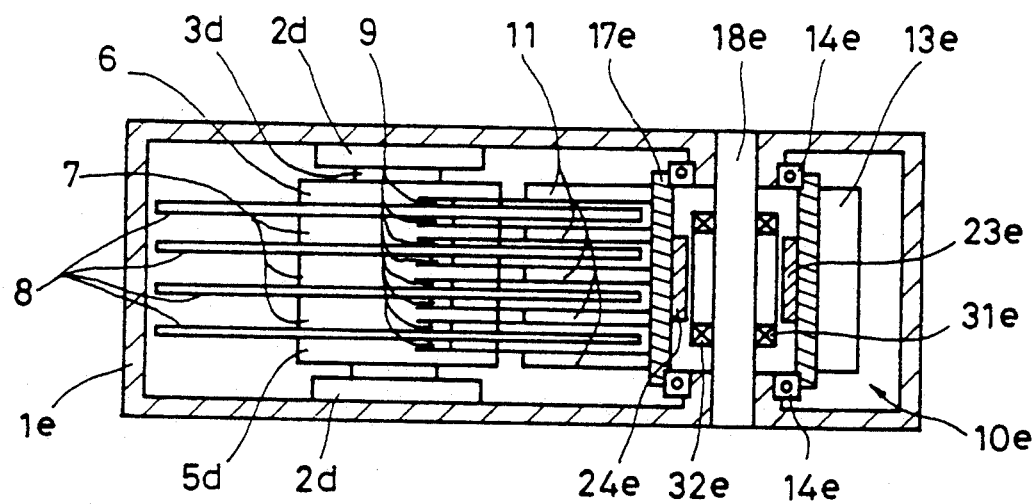
FIG. 9 is a cross-sectional diagram showing the overall structure of the magnetic disk apparatus based on the fourth embodiment of this invention.
Figure 10A:
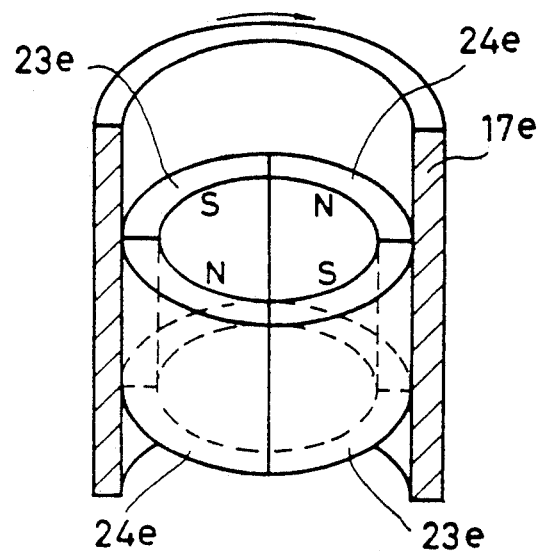
FIGS. 10A and 10B are a partially developed perspective diagram of the motor shown in FIG. 9.
Figure 10B:
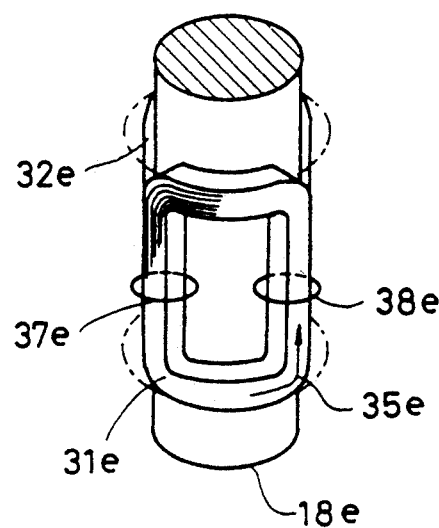

Next, the fourth embodiment of this invention will be described with reference to FIGS. 9, 10A and 10B.

This embodiment is a structure similar to the third embodiment, in which a disk drive motor (not shown) is built inside a hub 5d and a carriage turning motor is built inside a carriage 10e. The carriage 10e comprises a cylinder 17e made of ferromagnetic non-electrically-conductive material, a head support member 11 fitted on the cylinder 17e by means of a fixing member (not shown), and a counter weight 13e for complementing the head support member 11, as shown in FIG. 9. The cylinder 17e is supported rotatably on its both ends by bearings 14e provided in a housing 1e. Placed on the inner wall of the cylinder 17e are four magnet segments, 23e and 24e, as shown in FIG. 10A, which are magnetized in the radial direction so that adjoining magnet segments have opposite magnetic polarities. A fixed shaft 18e made of ferromagnetic material is placed along the central axis of the cylinder 17e. On the outer surface of the fixed shaft 18e in its virtually central section, there are secured two rectangle-wound coils 31e and 32e so as to confront the magnet segments 23e and 24e on the cylinder 17e. The total number of magnet segments is set equal to the total number of linear conductor sections of the coil parallel to the shaft 18e, as in the first embodiment.

With a drive current 35e being supplied to the two coils 31e and 32e in the same direction, magnetic fields are produced in the periphery of the linear conductor sections 37e and 38e of the coils 31e and 32e parallel to the fixed shaft 18e. These magnetic fields are opposite in direction at the adjoining linear conductor sections 37e and 38e. Since the four magnets placed on the cylinder 17e are located symmetrically with respect to the fixed shaft 18e, only momental forces act on the cylinder 17e by the magnetic fields produced by the magnets and coils, and the cylinder turns, as in the case of the first embodiment. This embodiment is simpler in structure as compared with the third embodiment, and it enhances the compactness and the easiness of assembling.

Figure 11:
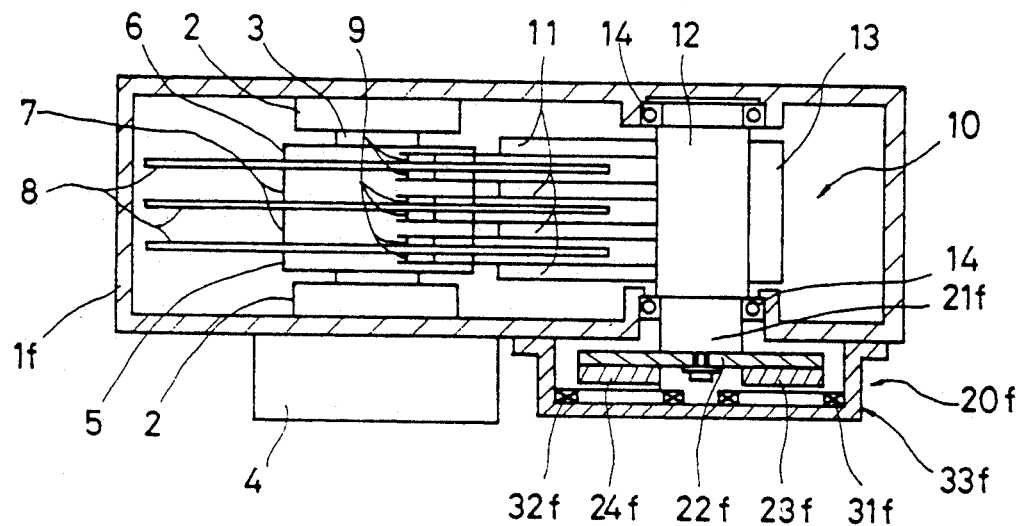
FIG. 11 is a cross-sectional diagram showing the overall structure of the magnetic disk apparatus based on the fifth embodiment of this invention.

Next, the fifth embodiment of this invention will be described with reference to FIGS. 11, 12A and 12B.

Figure 12A:
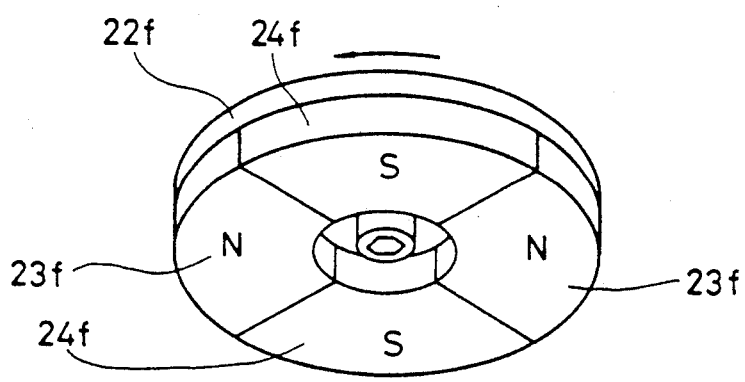
FIGS. 12A and 12B are a partially developed perspective diagram of the motor shown in FIG. 11.
Figure 12B:
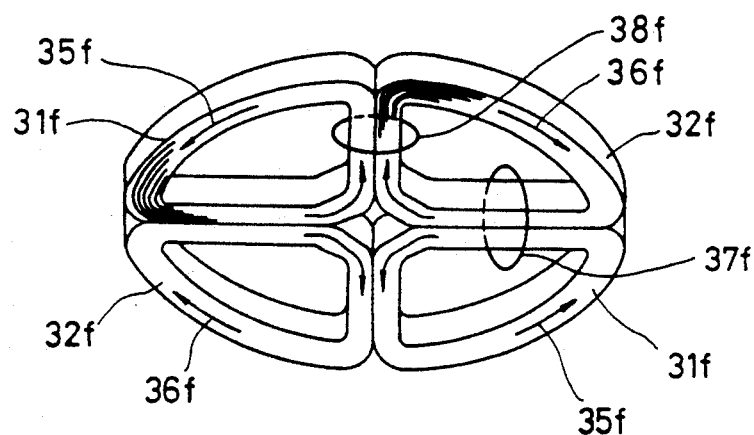

In contrast to the first embodiment, in which the magnets 23 and 24 are disposed on the motor shaft 12 so that their poles are oriented to the radial direction of the shaft 12 and the coils 31 and 32 are disposed on the stator so that their drive currents 35 and 36 flow along the outer circumference of the shaft 12, the fifth embodiment has magnet segments 23f and 24f disposed on the shaft 21f through the inner yoke 22f so that their magnetism is oriented in the longitudinal direction of the shaft 21f and has coils 31f and 32f disposed on the stator so that their drive currents 35f and 36f flow along the plane perpendicular to the axis of the shaft 21f, as shown in FIGS. 12A and 12B. The coils 31f and 32f are designed to have a total number of linear conductor sections extending in pairs in the radial direction set equal to the total number of magnet segments 23f and 24f. The reason for this arrangement is that it is sufficient for the motor 20f to turn 90° at most, e.g., 20°, to move the magnetic heads 9. Accordingly, the coils are disposed so that the linear sections 37f and 38f confront the same magnet segments 23f and 24f even if the motor 20f turns in its full range of turn.

Four flat fan-shaped magnet segments 23f and 24f are fixed on one end of the motor shaft 21f through a disc-shaped inner yoke 22f. The four magnet segments 23f and 24f are magnetized so that adjoining magnet segments have opposite polarities and their magnetism is oriented in the axial direction of the shaft 21f. An outer yoke 33f is provided to cover the magnet segments 23f and 24f and the inner yoke 22f. The outer yoke 33f is fixed on the housing 1f. Placed on the bottom of the interior of the outer yoke 33f are four fan-shaped planar coils 31f and 32f which confront the magnet segments 23f and 24f.

The four coils 31f and 32f are supplied with drive currents 35f and 36f such that adjoining coils have current flows in opposite rotational directions. Consequently, the drive currents flow in the same direction in the adjoining conductor sections 37f and 38f, and each pair of linear sections produces a magnetic field. The adjacent linear conductor pair produce magnetic fields of opposite polarities. Because of the symmetrical arrangement the rotor magnet segments 23f and 24f with respect to the shaft center, momental forces produced by the magnetic fields of the magnet segments 23f and 24f and the coils 31f and 32f act on the shaft 21f and it turns in the absence of a parallel force, as in the case of the first embodiment.

This embodiment enables the motor 20f to have a reduced dimension in the axial direction, whereby the overall apparatus can be made compact and the natural frequency of the shaft 21f can be raised.

Figure 13:
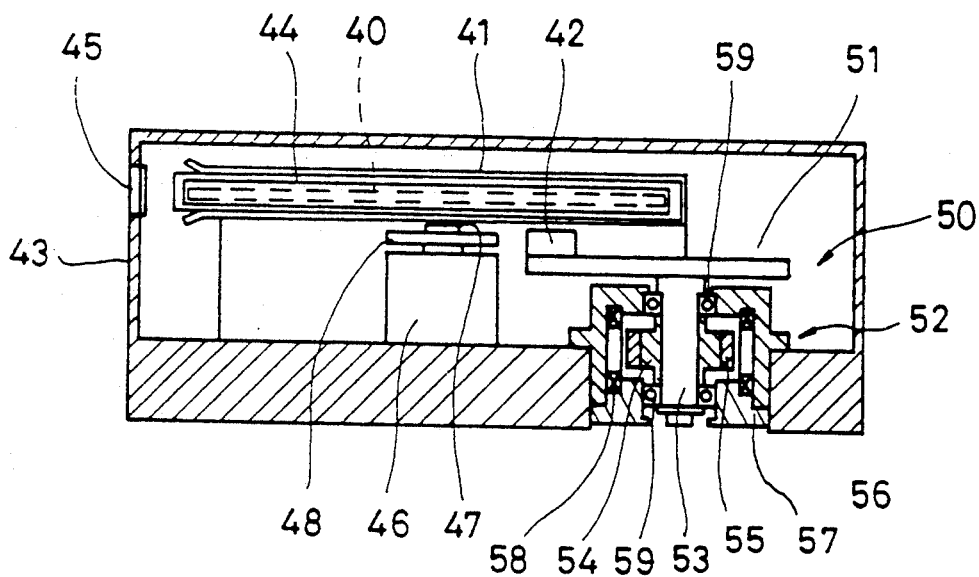
FIG. 13 is a cross-sectional diagram showing the overall structure of the magnetic disk apparatus based on the sixth embodiment of this invention.
Figure 14:
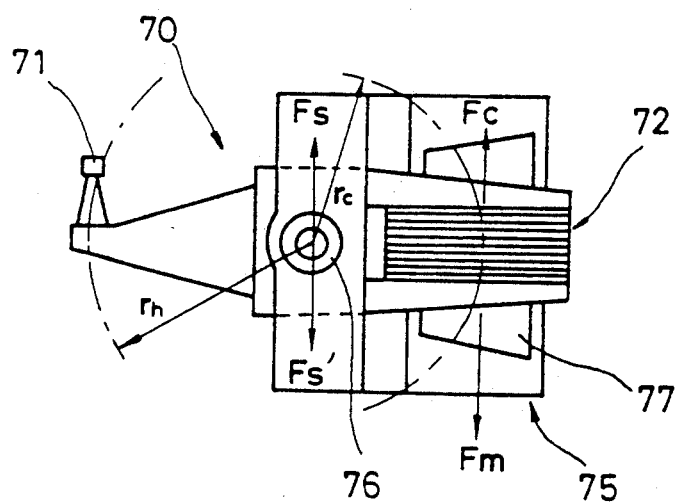
FIG. 14 is a top view of the conventional head positioning actuator.

Next, the sixth embodiment of this invention will be described with reference to FIG. 13.

This embodiment is an optical disk apparatus, which comprises a disk rotation mechanism for turning an optical disk 40, a disk loading mechanism 41 for loading the optical disk 40 to the rotation mechanism, an optical head 42, a head positioning device 50 for positioning the optical head 42 on the disk, and a cabinet 43 which houses these components. The optical disk 40 is enclosed in a cartridge 44 during the treatment on the apparatus. The cabinet 43 has a formation of an opening at its front face for inserting or ejecting the cartridge 44.

The optical disk rotation mechanism comprises a disk drive motor 46, a spindle 47 connected to the motor, a turn table 48 secured on the spindle 47 for mounting the optical disk 40, and a drive circuit which is not shown in the figure. The head positioning device 50 comprises a carriage 51 on which the optical head 42 is mounted, a motor 52 for driving the carriage 51, and a control circuit which is not shown in the figure. The optical head 42 includes an optical system which deals with the optical signals, a focus control mechanism, and a tracking control mechanism. The optical system, focus control mechanism and tracking control mechanism are not shown in the figure.

The motor 52 has a virtually same basic structure as the first embodiment, comprising a rotational shaft 53, an inner yoke 54 provided on the shaft 53, magnet segments 55, an upper and lower housings 56 and 57 which cover these components, coils 58 provided on the upper housing 56, and bearings 59 which support the shaft 53 rotatably. The shaft 53 of the motor 52 serves also as a shaft of the carriage 51.

When the optical disk 40 enclosed in the carriage 44 is inserted through the carriage port 45, it is loaded on the turn table 48 by the loading mechanism 41. The disk drive motor 46 is activated to turn the optical disk 40 on the turn table 48. The optical head 42 is moved to the specified position on the optical disk 40 by the head positioning device 50 in the absence of the vibration, as in the first embodiment. In response to the arrival of the optical head 42 at the specified position, the focus control and tracking control take place, and data recorded on the optical disk 40 is read out.

The inventive head positioning device is applicable to various record mediums, as shown in the above embodiments, which further include an optomagnetic disk for example.

We claim:

1. An electric rotary actuator for producing rotation through a limited angle to position magnetic heads of a magnetic disk apparatus over selected information-bearing tracks on magnetic disks in said magnetic disk apparatus, said actuator comprising:

a stator; and a cylindrical rotor which is positioned for rotation about an axis thereof relative to the stator, said rotor including plural pairs of permanent magnets, each pair of magnets being substantially radially magnetized with respect to the axis of the rotor, the permanent magnets being substantially cylindrically juxtaposed with respect to one another on the rotor about said rotor axis with adjacent magnets having their poles rotatably-magnetized reversely to one another on the rotor about said rotor axis with adjacent magnets having their poles rotatably-magnetized reversely to one another.

2. An electric rotary actuator according to claim 1, wherein the magnets have a conductive member over a surface thereof facing said stator.

3. An electric rotary actuator according to claim 1, wherein said stator includes at least one stator coil with linear conductor sections parallel to said rotor axis, a total number of said linear conductor sections being equal to a total number of said permanent magnets.

4. An electric rotary actuator according to claim 3, wherein said limited angle of rotation is less than or equal to 90°, said linear conductor sections of coil each confronting a corresponding same permanent magnet throughout the maximum rotational range of said actuator.

5. An electric rotary actuator according to claim 4, wherein the number of permanent magnets and the number of linear conductor sections of coil are four.

6. An electric rotary actuator according to claim 5, wherein said actuator has a cover disposed on the exterior surface thereof with a fin.

7. An electric rotary actuator according to claim 6, wherein a cylindrical short ring is disposed between an exterior surface of said permanent magnets and said stator.

8. A magnetic disk apparatus comprising:
a magnetic disk;
a magnetic head for recording or reproducing information on said magnetic disk;
a carriage on which the magnetic head is mounted; and
an electronic rotary actuator for rotating said carriage through a limited angle to position said magnetic head mounted on the carriage over selected information bearing tracks in the magnetic disk, wherein said actuator comprises a stator and a cylindrical rotor which is positioned for rotation about an axis thereof relative to the stator, said rotor including plural pairs of permanent magnets, each pair of magnets being substantially radially magnetized with respect to the axis of the rotor, the permanent magnets being substantially cylindrically juxtaposed with respect to one another on the rotor about said rotor axis with adjacent magnets having their poles rotatably-magnetized reversely to one another.

9. A magnetic disk apparatus according to claim 8, wherein the magnets have a conductive member over a surface thereof facing said stator.

10. A magnetic disk apparatus according to claim 8, wherein said stator includes at least one stator coil with linear conductor sections parallel to said rotor axis, a total number of said linear conductor sections being equal to a total number of said permanent magnets.

11. A magnetic disk apparatus according to claim 10, wherein said limited angle of rotation is less than or equal to 90°, said linear conductor sections of coil each confronting a corresponding same permanent magnet even if said shaft turns throughout the maximum rotational range of said actuator.

12. A magnetic disk according to claim 11, wherein the number of permanent magnets and the number of linear conductor sections of coil are four.

13. A magnetic disk apparatus according to claim 12, wherein said actuator has a cover disposed on the exterior surface thereof with a fin.

14. A magnetic disk apparatus according to claim 13, wherein a cylindrical short ring is disposed between an exterior surface of said permanent magnets and said stator.

* * * * *